(12) United States Patent
Meijer

(10) Patent No.: US 10,147,564 B2
(45) Date of Patent: Dec. 4, 2018

(54) SYSTEM AND METHODS FOR PROVIDING ORIENTATION COMPENSATION IN POINTING DEVICES

(71) Applicant: UNIVERSAL ELECTRONICS INC., Santa Ana, CA (US)

(72) Inventor: Gerben Meijer, Oosterbeek (NL)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 13/761,387

(22) Filed: Feb. 7, 2013

(65) Prior Publication Data

US 2014/0218290 A1 Aug. 7, 2014

(51) Int. Cl.
| | |
|---|---|
| *H01H 9/02* | (2006.01) |
| *H01H 35/02* | (2006.01) |
| *G06F 3/0346* | (2013.01) |
| *G08C 17/00* | (2006.01) |
| *H04N 21/422* | (2011.01) |

(52) U.S. Cl.
CPC ......... *H01H 9/0214* (2013.01); *G06F 3/0346* (2013.01); *G08C 17/00* (2013.01); *H01H 35/025* (2013.01); *H04N 21/42222* (2013.01); *G06F 2203/0384* (2013.01); *G08C 2201/32* (2013.01)

(58) Field of Classification Search
CPC .............................................. H04N 21/42222
See application file for complete search history.

(56) References Cited

U.S. PATENT DOCUMENTS

| | | | |
|---|---|---|---|
| 4,977,404 A | 12/1990 | Durst et al. | |
| 5,986,644 A | 11/1999 | Herder et al. | |
| 6,160,538 A | 12/2000 | Lambrechts | |
| 6,717,075 B1 | 4/2004 | Stavely et al. | |
| 7,489,299 B2 | 2/2009 | Liberty et al. | |
| 2007/0259716 A1* | 11/2007 | Mattice | G06F 3/013 463/36 |
| 2009/0179869 A1* | 7/2009 | Slotznick | G06F 3/0202 345/173 |
| 2009/0278793 A1* | 11/2009 | Hirano | G06F 3/0346 345/156 |
| 2009/0295713 A1* | 12/2009 | Piot | G06F 3/0346 345/156 |

(Continued)

OTHER PUBLICATIONS

ISA/US, International Search Report and Written Opinion issued on PCT Appln. No. US14/11572, received May 13, 2014, 10 pages.

(Continued)

*Primary Examiner* — Ryan A Lubit
(74) *Attorney, Agent, or Firm* — Greenberg Traurig, LLP

(57) ABSTRACT

Axis orientation compensation is provided in a system in which movement of a controlling device is used to control navigational functions of a target appliance by determining which one of plural sides of the controlling device is an active side of the controlling device and by causing navigational functions of the target appliance made relative to at least one of an X, Y, and Z axis of the target appliance to be dynamically aligned with movements of the controlling device made relative to at least one of an A, B, and C axis of the controlling device as a function of the one of the plural sides of the controlling device that is determined to be the active side of the controlling device.

9 Claims, 8 Drawing Sheets

(56) References Cited

U.S. PATENT DOCUMENTS

| | | |
|---|---|---|
| 2010/0164745 A1 | 7/2010 | Migos et al. |
| 2010/0238111 A1* | 9/2010 | Chen ................... G06F 3/0383 |
| | | 345/157 |
| 2011/0090407 A1* | 4/2011 | Friedman ......... H04N 21/42204 |
| | | 348/734 |
| 2011/0279223 A1* | 11/2011 | Hatambeiki .......... G06F 3/0346 |
| | | 340/4.3 |
| 2012/0287043 A1 | 11/2012 | Yamada et al. |

OTHER PUBLICATIONS

EPO, Extended European Search Report issued on European patent application No. 14748987.6, dated Nov. 25, 2015, 11 pages.

SIPO, Office Action issued on Chinese patent application No. 201480007215.4, received Jun. 20, 2017, 8 pages.

SIPO, 2nd Office Action issued on Chinese patent application No. 201480007215.4, received Oct. 13, 2017, 9 pages.

\* cited by examiner

SYSTEM AND METHODS FOR PROVIDING ORIENTATION COMPENSATION IN POINTING DEVICES

BACKGROUND

Controlling devices, for example remote controls, with multiple surfaces for use in issuing commands to appliances and the features and functionality provided by such controlling devices are known in the art. Traditionally, as disclosed in U.S. Publication No. 2010/0164745, the surfaces of such controlling devices are provided with user interface elements or command keys that are activable to cause the controlling device to transmit communications for controlling functional operations of one or more appliances. Controlling devices that may be used to control navigational functions of an appliance, e.g., to interact with displayed menu systems, to browse web pages, to manipulate pointers, and/or to perform other similar activities, are also known. For example, U.S. Pat. No. 7,489,299, U.S. Pat. No. 6,160,538, U.S. Pat. No. 4,977,404, and U.S. Pat. No. 5,986,644 each disclose a controlling device adapted to transmit communications for controlling navigational functions of an appliance.

SUMMARY

The following generally describes an improved system and method for using a controlling device having multiple surfaces to control navigational functions of an appliance. More particularly, the described system and method facilities control of navigational functions of an appliance by functioning to dynamically align an A, B, and C axis of a controlling device to an X, Y, and Z axis of an appliance based upon which of the multiple surfaces of the controlling device is determined to be the active surface. In this manner, as the controlling device is moved for the purpose of changing a one of the multiple surfaces of the controlling device that is to be placed into the active state, the controlling device can be still be conveniently utilized to interact with displayed menu systems, to browse web pages, to manipulate pointers, and/or to perform other similar activities. In a described embodiment an accelerometer may be utilized to detect changes in orientation of the controlling device for the purposes described herein.

BRIEF DESCRIPTION OF THE DRAWINGS

For a better understanding of the various aspects of the system and method hereinafter described, reference may be had to preferred embodiments shown in the attached drawings in which.

DETAILED DESCRIPTION

Figure 1:
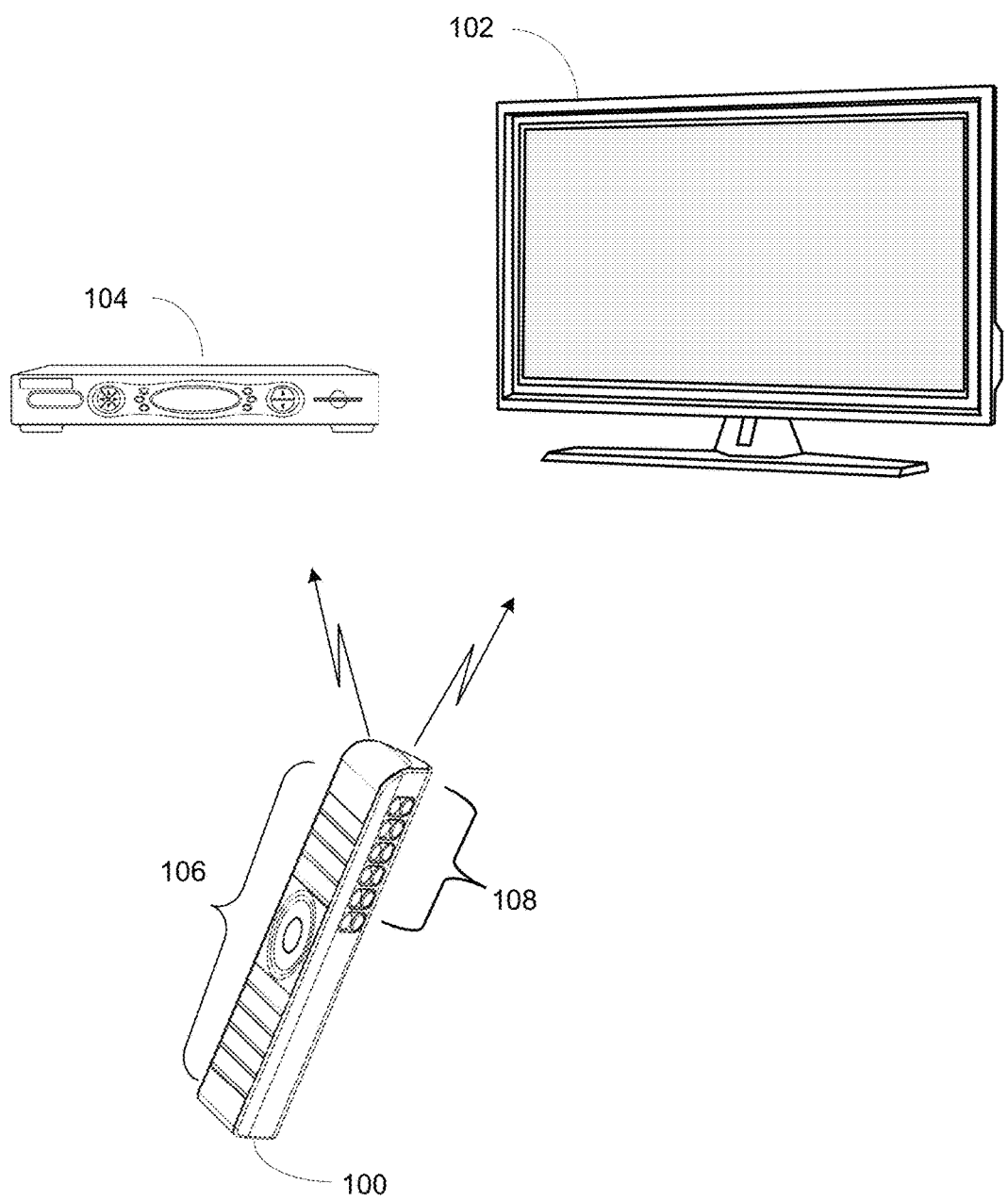
FIG. 1 illustrates an exemplary system in which an exemplary controlling device according to the detailed description may be used.

FIG. 1 illustrates an exemplary system in which a controlling device 100 is configured to control various controllable appliances such as, for example, a television 102 and a set top box ("STB") 104. As is known in the art, the controlling device 100 may be capable of transmitting commands to the appliances in response to user activation of various command function keys 106,108, 208 (illustrated in FIGS. 1 and 2) using any convenient IR, RF, Point-to-Point, or networked protocol, to cause the appliances to perform operational functions. When using IR, it may be desirous to utilize multiple IR LEDs such as described in commonly assigned, U.S. patent application Ser. No. 13/679,131, filed on Nov. 16, 2012, the disclosure of which is incorporated herein by reference in its entirety. While illustrated in the context of a television 102 and STB 104, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 2:
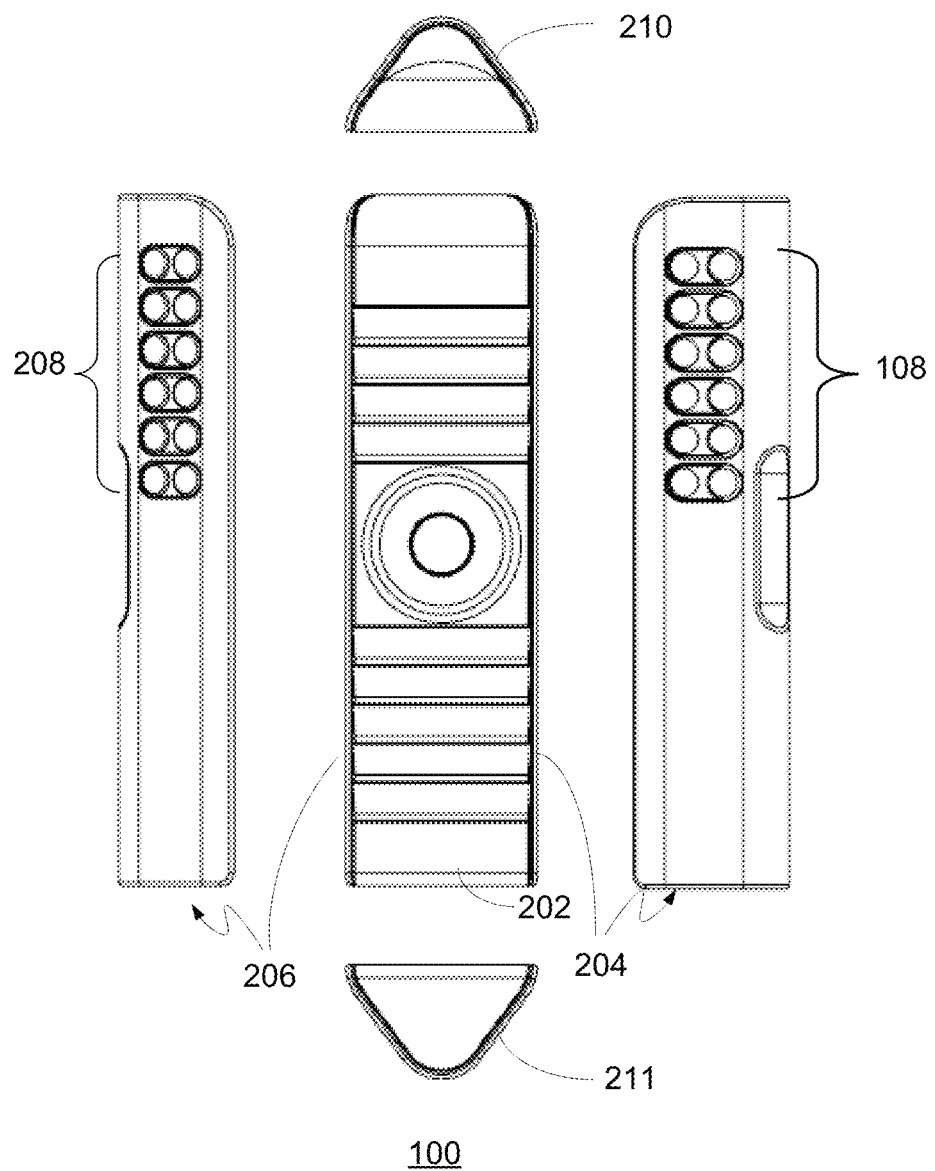
FIG. 2 illustrates the exemplary controlling device of FIG. 1 in greater detail.
Figure 6:
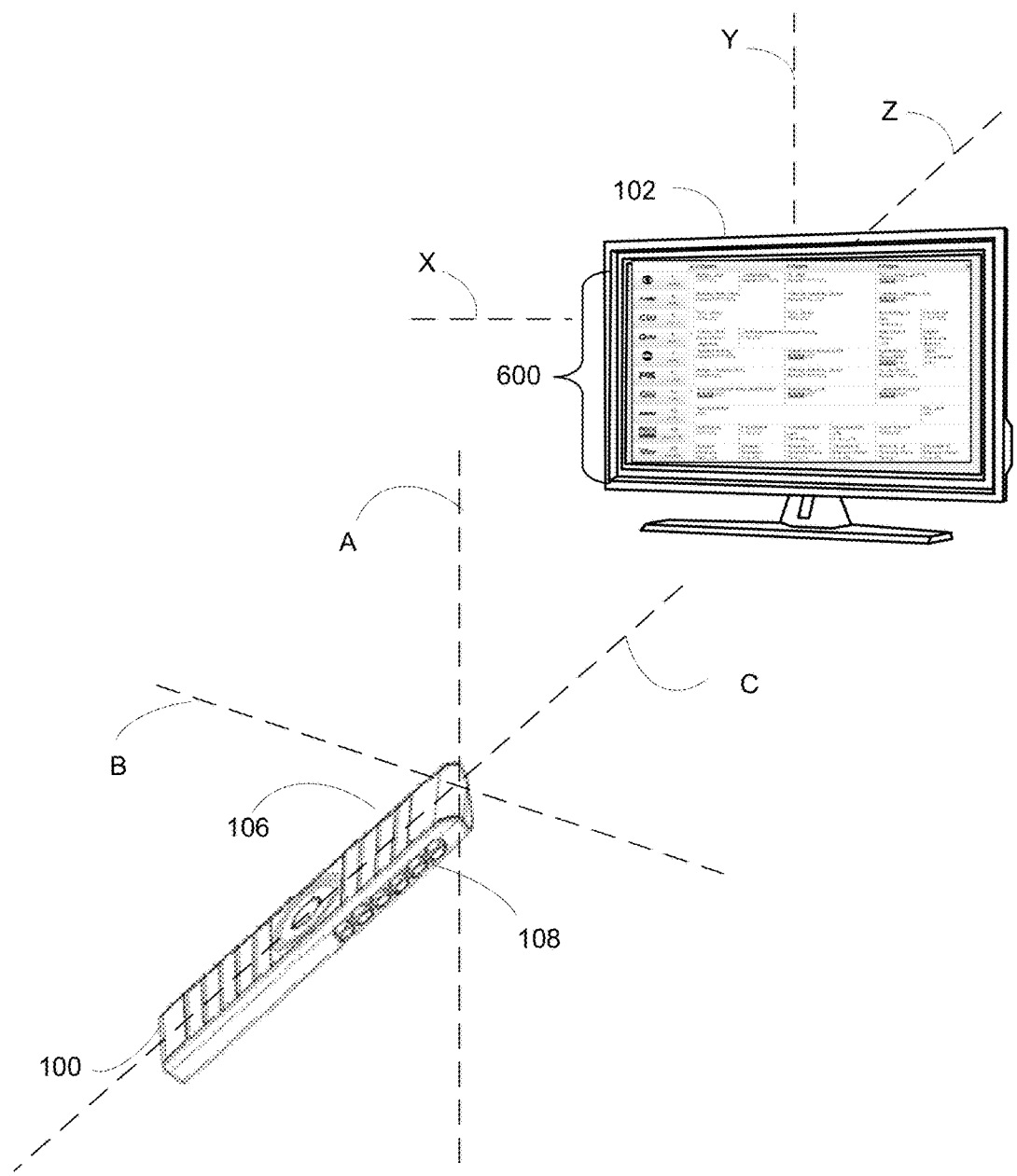
FIG. 6 illustrates an exemplary system in which an accelerometer equipped controlling device adapted to compensate for axis orientation may be utilized.
Figure 7:
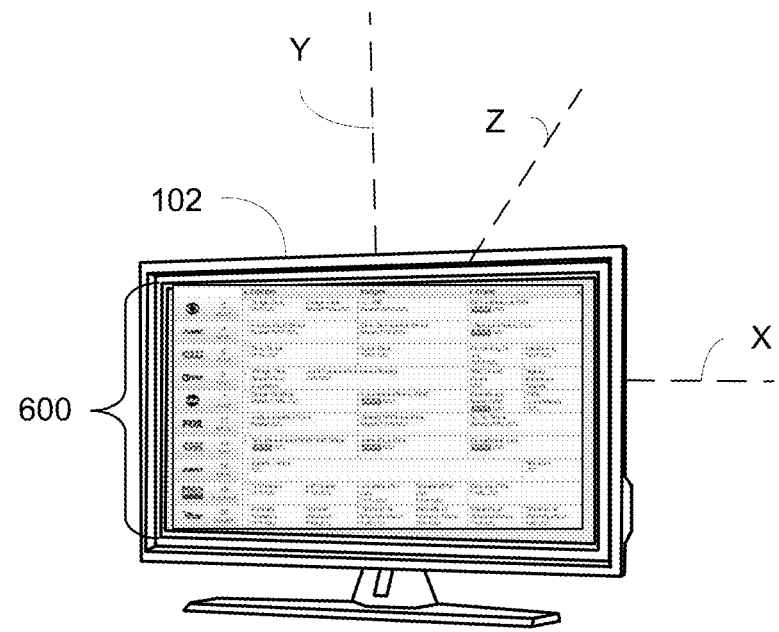
FIG. 7 illustrates a further exemplary system in which an accelerometer equipped controlling device adapted to compensate for the axis orientation may be utilized.
Figure 7:
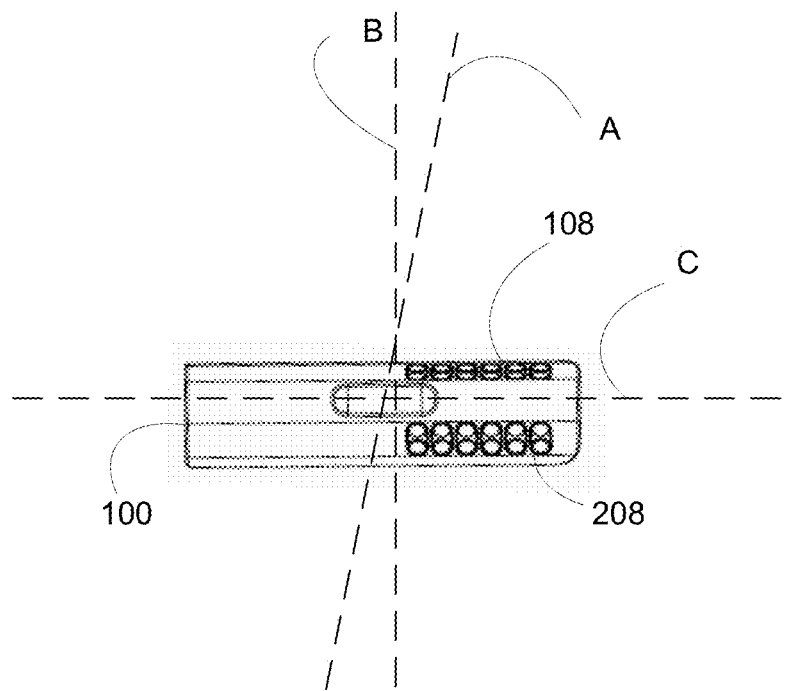

Turning to FIG. 2, an exemplary controlling device 100 having end surfaces 210 and 211 and multiple side surfaces 202, 204, and 206 having elements for receiving user input is illustrated. By way of example, the first side surface 202 comprises command function keys 106, the second side surface 204, located to the right of the first side surface, comprises an alphanumeric keyboard 108 arranged in a conventional "qwerty" manner, and the third side surface 206, located to the left of the first side surface 202, comprises additional command function keys 208. In such a three-sided embodiment, a motion sensor, such as an accelerometer, gyroscope, or the like, may be used to generate an orientation signal for use in determining which side surface 202, 204 or 206 of the controlling device 100 is generally facing upwards or towards the user, e.g., which surface is considered to be the active surface of the controlling device 100, whereupon operational software can function to correspondingly align the axes of the controlling device 100 (e.g., the A, B, and C axes) to the axes of a target appliance (e.g., the X, Y, and Z axes). For example, in an exemplary embodiment, when the first side 202 of the controlling device 100 is the active surface, a user will generally hold the controlling device 100 in an orientation as illustrated in FIG. 6 whereby the C axis of the controlling device (in this example the longitudinal axis of the controlling device 100) will be generally pointing towards the target device (e.g., be generally aligned with the Z-axis of the target device) and, when the second side 204 of the controlling device 100 is the active surface, a user will generally hold the controlling device 100 in an orientation as illustrated in FIG. 7 whereby the C axis of the controlling device will be generally oriented parallel to the target device (e.g., be generally aligned with the X-axis of the target device). It will be understood that such orientations are not required and the examples illustrated herein are therefore not intended to be limiting in any manner.

Figure 3:
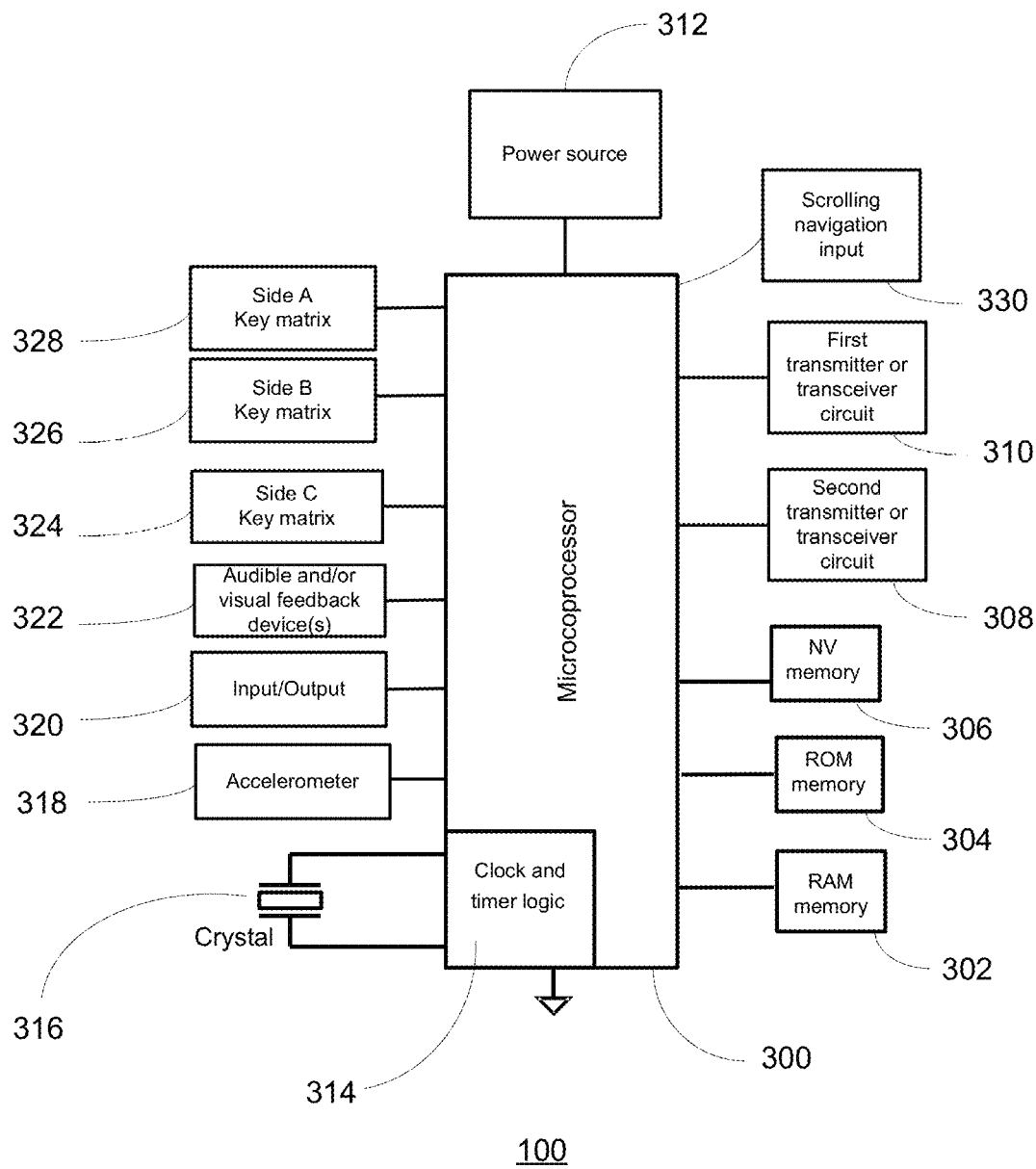
FIG. 3 illustrates a block diagram of exemplary components of the exemplary controlling device of FIGS. 1 and 2.

With reference to FIG. 3, for use in commanding the functional operations of one or more appliances, the controlling device 100 may include, as needed for a particular application, a processor 300 coupled to a ROM memory 304; a RAM memory 302; one or more key matrices 324,326,328 as required to support keys 208,106,108 on each of the multiple input surfaces (e.g., hard keys, soft keys such as a touch sensitive surface overlaid on a liquid crystal (LCD), and/or an electroluminescent (EL) display); one or more transmission circuit(s) and/or transceiver circuit(s) 308,310 (e.g., IR and/or RF); a non-volatile read/write memory 306; means 322 to provide visual and/or audible feedback to the user (e.g., one or more LEDs, LCD display, speaker, piezoelectric buzzer, or the like); a power source 312; an input/output port 320 such as a serial interface, USB port, modem, Zigbee, WiFi, or Bluetooth transceiver, etc.; one or more means (not shown) for backlighting areas of touchpad 330 and/or key matrices 324,326,328; means 318 for use in determining the motion and/or orientation of controlling device 100, for example an accelerometer, gyroscope, etc.; and clock and timer logic 314 with associated crystal or resonator 316.

As will be understood by those skilled in the art, some or all of the memories 302, 304, 306 may include executable instructions that are intended to be executed by the processor 300 to control the operation of the remote control 100 (collectively, the operational software), as well as data which serves to define to the operational software the necessary control protocols and command values for use in transmitting command signals to controllable appliances (collectively, the command data). To cause the controlling device 100 to perform an action, the controlling device 100 may be adapted to be responsive to events, such as a sensed user interaction with the key matrices 324,326,328, touchpad 330, movement of the controlling device 100, etc. In response to an event, appropriate operational software instructions within the program memory may be executed.

Figure 4:
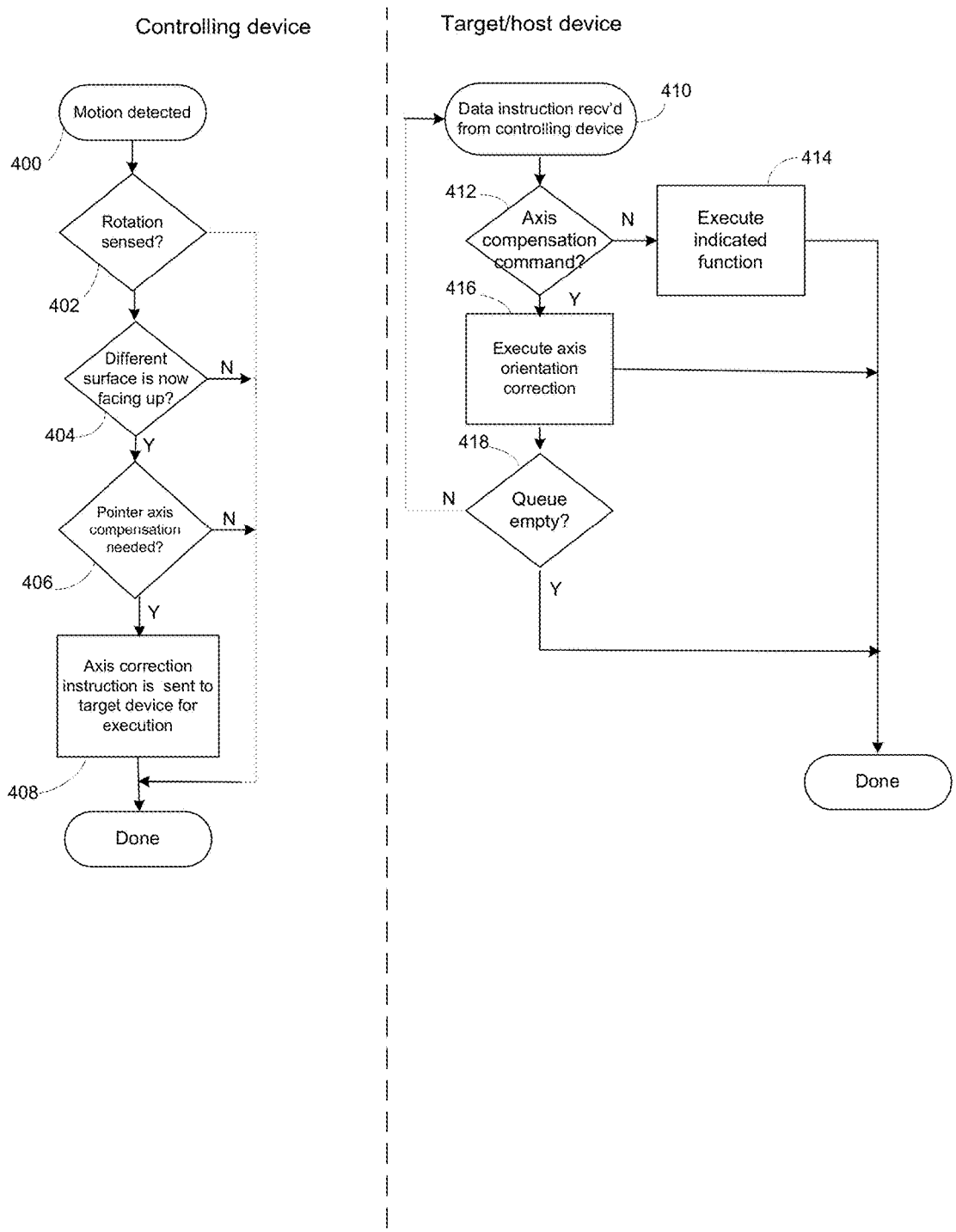
FIG. 4 illustrates in flow chart form an exemplary method for detecting motion of an active input surface of a multi-surfaced controlling device and for compensating for the axis orientation of the controlling device by the target appliance.

Turning to FIG. 4, in a first exemplary embodiment the operational software of controlling device 100 uses data derived from the sensor 318 to detect the orientation of controlling device 100 to thereby determine which side surface 202, 204, and 206 is considered to be the active surface of the controlling device 100. As will be appreciated, based upon which side surface 202, 204, 206 is detected as being the active surface of the controlling device 100, the orientation of the controlling device 100 relative to target appliance can be inferred. For example, when side surface 202 of the controlling device 100 is sensed as being the active side surface of the controlling device 100 it can be inferred that the controlling device 100 will be generally used in an oriented relative to the target appliance as shown in FIG. 7 and when side surface 204 of the controlling device 100 is sensed as being active side surface of the controlling device 100 it can be inferred that the controlling device 100 will be generally used in an orientation oriented relative to the target appliance as shown in FIG. 6. Based upon this information the controlling device 100 can inform the target appliance that the target appliance needs to adjust any axis-referenced pointing data that is being received by the target appliance from the controlling device 100 as appropriate to compensate for the current orientation of the controlling device 100.

More particularly, the motion of the controlling device 100 is detected 400 by the sensor 318 and, when it is sensed that the controlling device 100 has been rotated 402 to the right or to the left to a degree that indicates that the active side surface 202, 204, 206 of the remote control 100 has changed 404 (e.g., the controlling device 100 is sensed to have rotated past a predetermined, threshold angle) and, therefore, that pointer axis compensation is needed 406, a signal is transmitted 408 to the target appliance by the controlling device 100 for the purpose of indicating to the target appliance that the target appliance will need to perform pointer axis compensation with respect to any axis-referenced navigational data that is being sent to the target appliance by the controlling device 100. Thus, when a data communication 410 from controlling device 100 is received by a target appliance and the data communication 410 includes data indicative of an instruction for the target appliance to perform pointer axis compensation, the target appliance will initiate appropriate processes or actions 416 necessary to perform the indicated function, e.g., the target appliance operation software executes the command to align data indicative of movement of the controlling device relative to the A, B, and C axes of the controlling device 100 as received from the controlling device 100 to the X, Y, and Z axes of the target appliance to compensate for which side surface 202,204,206 of the controlling device 100 is now active. If the command is not a pointer axis compensation type, at step 414 the appropriate processes or actions necessary to perform the indicated function are initiated within the target appliance, and processing of the received message is complete. At step 418 the operational software of the host appliance may also examine the remaining contents of the instruction queue and, if the instruction queue is empty, processing of the received message may be considered to be complete. While described above in the context of a separate orientation adjustment command transmitted from a controlling device 100 to a target appliance, it will be appreciated that in alternate embodiments other techniques for communicating this information may be employed. For example, rather than taking the form of a separate transmission, orientation data may be embedded into the command data comprising each regular navigation/pointer output, for example by way of a predetermined bit field within each transmitted data packet.

Figure 5:
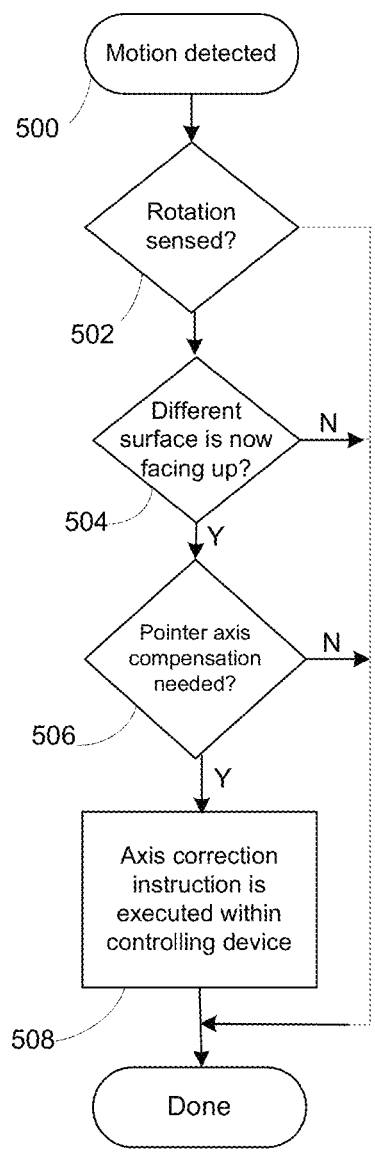
FIG. 5 illustrates in flow chart form an exemplary method for detecting motion on an active input surface of a multi-surfaced controlling device and for compensating for the axis orientation of the controlling device by the controlling device itself.

With reference to FIG. 5, in a second exemplary embodiment the operational software of controlling device 100 uses data derived from the sensor 318 to detect the orientation of controlling device 100 to thereby determine which side surface 202, 204, and 206 is considered to be the active surface of the controlling device 100. Based upon this information the controlling device 100 will itself adjust any axis-referenced pointing data that is being transmitted to the target appliance as appropriate to compensate for the current orientation of controlling device 100. More particularly, the motion of the controlling device 100 is detected 500 by the sensor 318 and, when it is sensed that the controlling device 100 has been rotated 502 to the right or to the left to a degree that indicates that the active side 202, 204, 206 of the remote control 100 has changed 504 (e.g., the controlling device 100 is sensed to have rotated past a predetermined, threshold angle) and, therefore, that pointer axis compensation is needed 506, the controlling device 100 will initiate appropriate processes or actions 508 necessary to perform the indicated function, e.g., the controlling device 100 functions to align movements of the controlling device relative to the A, B, and C axes of the controlling device to the X, Y, and Z axes of the target device to compensate for which side surface 202,204,206 of the controlling device 100 is now active. The target appliance is then provided with the compensated movement data that has been properly aligned to the X, Y, and Z axes of the target appliance whereupon the target appliance can perform the commanded navigational functions as appropriate.

By way of further example, a sensor 318 incorporated into a controlling device 100 may be used to sense movement of the controlling device 100 relative to the A, B, and C axis of the controlling device 100. Movement of the controlling device 100 relative to the A, B, and C axes can then be used to control 2D and/or 3D navigational functions of the target appliance, such as television 102. In this regard, when the second side surface 204 of the controlling device is determined to be active, movement of the controlling device 100 can be used to control 2D and/or 3D navigation within an the exemplary program guide 600 illustrated in FIG. 7 based on motions made by the controlling device 100. In this example, when the second side surface 204 is determined to be the active side of the controlling device 100, movement of the controlling device 100 relative to the A axis of the controlling device 100 will be used to control navigational functions relative to the Z axis of the target device, rotational movement of the controlling device 100 the B axis of the controlling device 100 will be used to control movement of the controlling device 100 relative to the X axis of the target device, and rotational movement of the controlling device 100 relative to the C axis of the controlling device 100 will be used to control navigational functions relative to the Y axis of the target device.

If it is then determined that the first side surface 202 of the controlling device 100 is now active as shown in FIG. 6, as a result of a sensed turning or rotation of the controlling device 100, movement of the controlling device 100 relative to the C axis of the controlling device 100 will be used to control navigational functions relative to the Z axis of the target device, rotational movement of the controlling device 100 relative to the B axis of the controlling device 100 will be used to control navigational functions relative to the Y axis of the target device, and rotational movement of the controlling device 100 relative to the A axis of the controlling device 100 will be used to control navigational functions relative to the X axis of the target as the altered pointer axes of the controlling device have now been compensated for.

Figure 8:
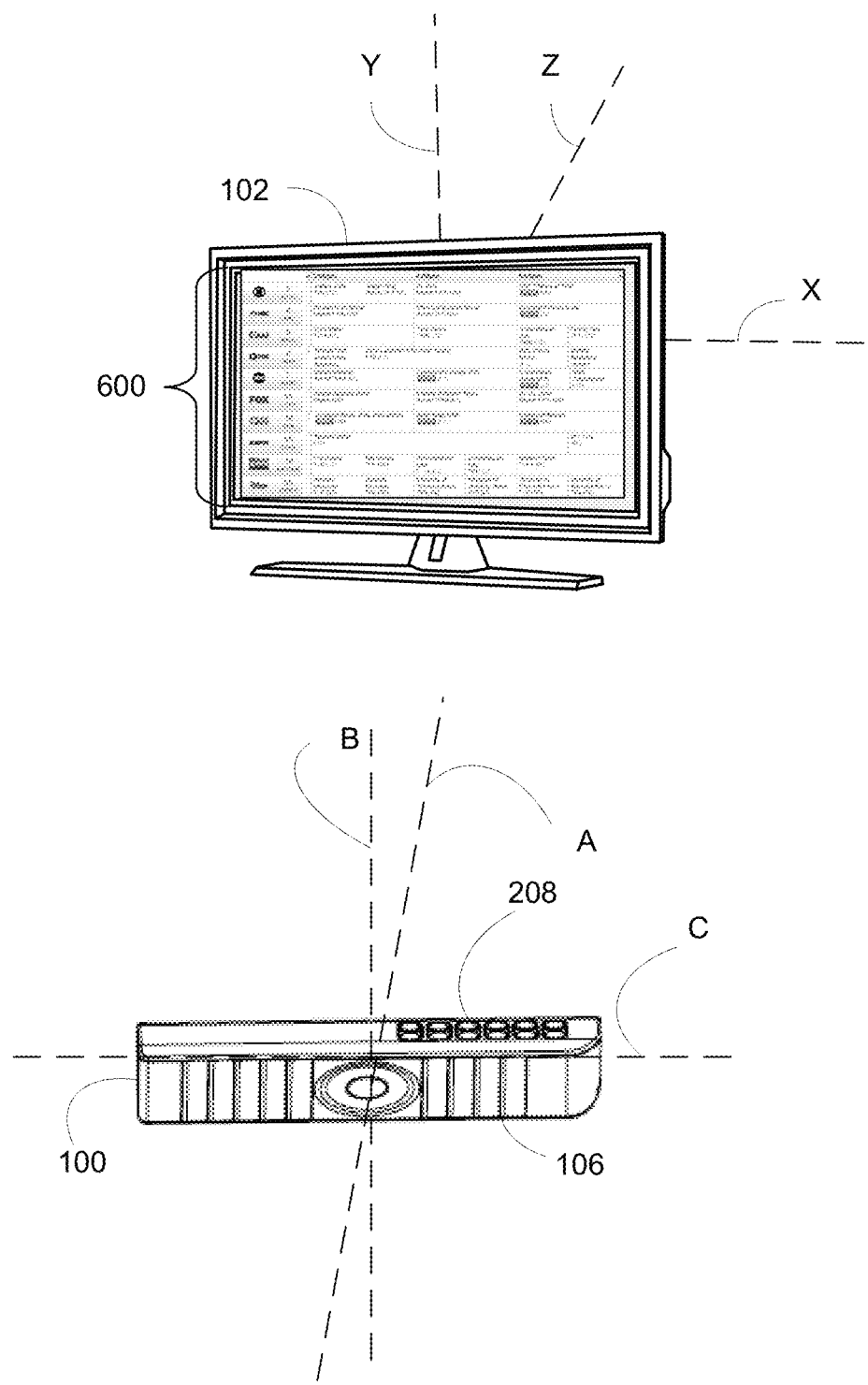
FIG. 8 illustrates a still further exemplary system in which an accelerometer equipped controlling device adapted to compensate for the axis orientation may be utilized.

If it is then determined that the third side surface 206 of the controlling device is the active side surface of the controlling device 100, movement of the controlling device 100 can be used to control 2D and/or 3D navigation within an the exemplary program guide 600 illustrated in FIG. 8 based on motions made by the controlling device 100. In this example, when the third side surface 206 is determined to be the active side of the controlling device 100, movement of the controlling device 100 relative to the A axis of the controlling device 100 will be used to control navigational functions relative to the Z axis of the target device, rotational movement of the controlling device 100 about the C axis of the controlling device 100 will be used to control movement of the navigational functions relative to the Y axis of the target device, and rotational movement of the controlling device 100 about the B axis of the controlling device 100 will be used to control navigational functions relative to the X axis of the target device.

While the above describes embodiments utilize a rotational movement of the controlling device 100 relative to an A, B, and/or C axis of the controlling device to control navigation relative to a corresponding one of the X, Y, and Z axes of the target device, it will be appreciated that linear movements of the controlling device 100 (e.g., up and down movements and/or side to side movements of the controlling device 100) can equally be sensed and used for the purpose of controlling navigational functions of the target device while also using the axis compensation techniques as described hereinabove. Furthermore to the extent that the A, B, and C axes of the controlling device 100 are caused to be angularly offset relative to the X, Y, and Z axes of the target device, for example when the A, B, and C axes of the controlling device 100 are referenced to one side of the controlling device facing horizontally upward, the movement data relative to the A, B, and C axes of the controlling device 100 can be provided with an angular offset as needed for the purpose of aligning the A, B, and C axes of the controlling device 100 with the X, Y, and Z axes of the target appliance.

While various concepts have been described in detail, it will be appreciated by those skilled in the art that various modifications and alternatives to those concepts could be developed in light of the overall teachings of the disclosure. For example, while described in the exemplary context of a controlling device such as a remote control, it will be appreciated that the principles and concepts described herein may be applied to any device that receives inputs and/or outputs communications, such as, PDAs, portable computers, phones, game controllers, portable gaming device, computer peripherals, and the like. Additionally, while accelerometer-derived orientation and motion sensing is used in the illustrative examples presented above, it will be appreciated that various other sensing technologies, for example without limitation a gyroscopic device, infra-red or ultrasonic reflection analysis, etc. may be used in alternative embodiments without departing from the spirit of the invention. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All documents cited within this disclosure are hereby incorporated by reference in their entirety.

What is claimed is:

1. A method for providing axis orientation compensation in a system in which movement of a controlling device having a plurality of sides is used to control navigational functions of a target appliance, comprising:

determining which one of the plurality sides of the controlling device is an active side of the controlling device;

when it is determined that a first one of the plurality of sides of the controlling device is an active side of the controlling device, causing a navigational function of the target appliance made relative to an X axis of the target appliance to be controlled by a movement of the controlling device made relative to a B axis of the controlling device, causing a navigational function of the target appliance made relative to a Y axis of the target appliance to be controlled by a movement of the controlling device made relative to a C axis of the controlling device, and causing a navigational function of the target appliance made relative to a Z axis of the target appliance to be controlled by a movement of the controlling device made relative to an A axis of the controlling device; and when it is determined that a second one of the plurality of sides of the controlling device is an active side of the controlling device, causing the navigational function of the target appliance made relative to the X axis of the target appliance to be controlled by a movement of the controlling device made relative to the A axis of the controlling device, causing a navigational function of the target appliance made relative to the Y axis of the target appliance to be controlled by a movement of the controlling device made relative to a one of the B axis of the controlling device, and causing a navigational function of the target appliance made relative to the Z axis of the target appliance to be controlled by a movement of the controlling device made relative to the C axis of the controlling device;

wherein control of the navigational functions of the target appliance made relative to each of the X, Y, and Z axes of the target appliance continues to be enabled without regard to whether the first one of the plurality of sides or the second one of the plurality of sides is determined to be the active side of the controlling device.

2. The method as recited in claim 1, wherein the controlling device comprises at least one orientation sensor and the method comprises using a signal generated by the at least one orientation sensor to determine which one of plural sides of the controlling device is the active side of the controlling device.

3. The method as recited in claim 2, wherein the at least one orientation sensor comprises an accelerometer.

4. The method as recited in claim 2, comprising using the signal generated by the at least one orientation sensor to track movements of the controlling device made relative to the at least one of the A, B, and C axes of the controlling device.

5. The method as recited in claim 1, wherein the controlling device transmits commands to the target appliance in response to movements of the controlling device made relative the A, B, and C axis of the controlling device for controlling navigational functions of the target appliance that are referenced to the X, Y, and Z axes of the target appliance.

6. The method as recited in claim 1, wherein the controlling device transmits to the target appliance a signal having data indicative of the one of the plural sides of the controlling device that is determined to be the active side of the controlling device, and wherein the controlling device transmits generic commands to the target appliance for controlling navigational functions of the target appliance that are referenced to the A, B, and C axes of the controlling device.

7. The method as recited in claim 6, comprising causing the controlling device to transmit the data indicative of the one of the plural sides of the controlling device that is determined to be the active side of the controlling device with commands to the target appliance for controlling navigational functions of the target appliance.

8. The method as recited in claim 1, comprising cause the controlling device to transmit to the target appliance a command for controlling a navigational function of the target appliance in response to the controlling device being sensed to have been rotationally moved relative to at least one of the A, B, and C axes of the controlling device.

9. The method as recited in claim 1, wherein the controlling device is adapted to be used in a first orientation wherein the C axis of the controlling device is generally aligned with the X axis of the target appliance when the first one of the plural sides of the controlling device is active and wherein the controlling device is adapted to be used in a second orientation wherein the C axis of the controlling device is generally aligned with the Z axis of the target appliance when the second one of the plural sides of the controlling device is active.

* * * * *